United States Patent Office 3,341,466
Patented Sept. 12, 1967

3,341,466
PROCESS FOR MAKING CAPSULES
Carl Brynko, 4320 Frieda Lane 45429; Joseph A. Bakan, 1230 Benfield Drive 45429; Robert E. Miller, 2319 Rockwell Court 45420; and Joseph A. Scarpelli, 245 Wroe Ave. 45406, all of Dayton, Ohio
No Drawing. Continuation of application Ser. No. 137,992, Sept. 14, 1961. This application Oct. 31, 1966, Ser. No. 591,023
4 Claims. (Cl. 252—316)

This invention relates to an improved process for making capsules with seamless walls that conform to retained nucleus materials, and to its capsule product.

This application is a continuation of copending application Ser. No. 137,992, filed Sept. 14, 1961, and now abandoned.

The novel process utilizes coacervation in a novel manner to enable stronger-walled large-sized capsules to be made and also to enable pH-sensitive or temperature-sensitive materials to be encapsulated, which was not possible with prior-art processes utilizing coacervation. The process involves the dispersal of intended nucleus material particles and intended wall-forming material in a liquid manufacturing vehicle and the treatment of the system thus provided to form a three-phase system. Particularly, the nucleus material is substantially water-insoluble and may be liquid, solid, or a combination of liquid and solid materials; the vehicle is aqueous; and the wall material is a film-forming temperature-gelable polymeric material which can be dissolved and subjected to phase separation in the aqueous vehicle by coacervation techniques.

Coacervation of an aqueous solution of hydrophilic film-forming polymeric materials is the separation of it into a polymer-rich phase and a polymer-poor phase, the two phases having a common aqueous solvent vehicle, hereinafter at times termed the "manufacturing vehicle" or just the "vehicle." In the particular process of this invention, molecular complexes of polymeric materials are used, such complexes being formed by the joinder of negatively-charged polymeric material molecules with positively-charged polymeric material molecules, all originally dispersed in the manufacturing vehicle to form a mixed sol. The treatment of the manufacturing vehicle and its contents with agitation, as will be described, induces the complex joinder of the molecules of the polymeric material, its resultant coacervate phase separation, and its dispersal in the vehicle as small entities. The deposit of such coacervate entities on dispersed nucleus particles as a liquid wall is made under controlled temperature conditions to enable the improved results to be obtained. The liquid-walled capsules thus formed can be gelled and hardened to complete their manufacture.

The previously-published art, as disclosed in United States Patent No. 2,800,457, which issued July 23, 1957, on the application of Barrett K. Green and Lowell Schleicher, shows the manufacture of microscopic capsules having walls of gelled and hardened complex polymeric materials, but that disclosed process was not adapted for making strong-walled capsules of macroscopic size, as the deposit of the capsule wall material was carried on in an agitated manufacturing liquid vehicle kept at a temperature much higher than the gelling temperature of the deposited wall material. This high temperature keeps the deposited material very liquid, and this, combined with the shearing forces produced by the agitation of the vehicle and the accompanying decrease in viscosity of the undeposited polymeric material caused by the denser fractions of the complex material in the vehicle depositing first, limits the effective wall thickness, when gelled, to about five microns. Such thin walls, while effective to retain microscopic droplets, do not effectively hold liquid nucleus droplets larger than those of microscopic size.

A process for making capsules of minute size—that is, of microscopic size and larger—is disclosed in an application for United States Letters Patent, Serial No. 784,020, filed Dec. 31, 1958, by Carl Brynko and Joseph A. Scarpelli, and now U.S. Patent No. 3,190,837. This improved process used the coacervation technique just described but added the step of rejuvenating the vehicle with added polymer, in order to establish conditions favorable for more deposit of wall material. A reestablishment of denser fractions is brought about by this rejuvenation, and these newly-provided denser fractions deposit on the first deposit to make a thicker deposit on the nuclei than was possible before. Capsules thus made may be of visible size, even with liquid contents, due to the increase provided in the capsule-wall thickness; but still, in the improved Brynko-Scarpelli process the step of deposition of the wall material was carried on at a temperature much above the gelation temperature of the wall material, with consequent limitation of ultimate capsule wall thickness due to the shearing forces produced by the agitation of the system.

The process of this invention is a still further improvement over the mentioned patent art, in that large capsules with thick walls can be made without resorting to the rejuvenation technique. The salient feature of the process of this invention is to warm the vehicle only for the time necessary to form a solution of the wall material and to initiate complex coacervation of the denser fractions of the polymeric materials dispersed in the vehicle, after which, cooling thereof to room temperature is commenced, as the phase separation of the coacervate entities by fractions progresses due to the drop in temperature. The coacervate entities formed at high temperature increase in viscosity as the cooling proceeds. The later-formed coacervate entities are also viscous due to the cooling of the system. These viscous coacervate entities are kept in dispersion and can be effective to build up thick walls on any dispersed nuclei with which they may come into contact. The entities resist the effect of agitation of the vehicle, which tends to strip the liquid wall material off.

The nucleus material may be introduced at any time up this point of the process.

The materials in the preferred form of the invention are so selected that the pH of the system need not be adjusted below 6.8 to initiate coacervation, although it may be lowered below that point if desirable, and it need not be adjusted after introduction of the nucleus material and its liquid encapsulation. This permits the use of both alkali-sensitive and acid-sensitive nucleus materials.

Complexes of hydrophilic polymeric materials of the film-forming type may be formed in a warm (30 degrees to 45 degrees centigrade) aqueous solution of gelatin and complexing negatively- and positively-charged polymeric materials in a pH environment as high as 6.8 and as low as 4, depending on the normal relative charges of the component material molecules. In some instances, it is desirable to encapsulate materials which might react with the capsule wall material at a certain pH, and such may be avoided by the choice of polymeric materials which form complex coacervate phases at other pH conditions.

The invention is well adapted to the making of capsules ranging from 100 to 15,000 microns in average dimension, the upper limit being obtainable by reason of the thick and viscous coatings made possible by the cool condition of the temperature-gelable complex polymeric material entities as they are being deposited on the nucleus material particles, the size of which particles largely controls the ultimate capsule size. It has been found that coacervate entities of high viscosity build up the thicker walls required for the retention of large liquid nuclei, as the viscous deposit resists the shearing forces which accompany the necessary agitation of the vehicle.

Therefore, the object of the invention is to provide a novel process for making capsules having seamless walls of hydrophilic film-forming polymeric material conforming to an enclosed nucleus of substantially water-immiscible material, either liquid, solid, or mixtures thereof, the process including the manufacture of capsules in an aqueous vehicle by coacervate deposition of the wall material on dispersed nuclei under controlled temperature conditions. The process is adapted to the manufacture of capsules of a size that can be individually handled down to a size so small as to be of microscopic dimensions.

The process of this invention will now be described with respect to five examples and to various equivalents for specific materials disclosed in the examples.

EXAMPLE I

In this, the preferred example, there will be described the encapsulation of toluene as a typical water-immiscible liquid of a volatile nature which presents all the difficulties in the en masse manufacture of large-sized, liquid-containing capsules in a liquid vehicle. This and the other examples are given with amounts based on the use of a two-liter vessel, but such in no way limits the process, as it may be enlarged upon for commercial practice.

The wall-forming polymeric materials are pigskin gelatin having an iso-electric point of approximately 8.9, gum arabic, and ethylenemaleic anhydride copolymer material of two different molecular weights. During the initial part of the process, the pH of the system is adjusted to about 6.8, and the temperature is raised above the gelation temperature, to initiate coacervation between fractions of the polymers, the gelatin molecules having a positive net charge, and the other polymer molecules having a negative net charge.

Into a two-liter beaker are placed

| | |
|---|---|
| Water _____ liters__ | 1 |
| Gelatin aqueous solution of 11% by weight, pigskin gelatin having an iso-electric point of 8.9 milliliters__ | 180 |
| Gum arabic aqueous solution of 11%, by weight, gum arabic _____ milliliters__ | 180 |
| Ethylenemaleic anhydride copolymer (molecular weight 1500-absolute viscosity) as a 2%, by weight, aqueous solution with pH adjusted to 9 _____ milliliters__ | 40 |
| Ethylenemaleic anhydride copolymer (molecular weight 100,000-absolute viscosity) as a 2%, by weight, aqueous solution with pH adjusted to 9 _____ milliliters__ | 40 |

Next, the system is agitated; the temperature is raised to 35 degrees centigrade; and the pH of the system is adjusted to 6.8 to induce complex coacervation, after which is introduced 250 milliliters of toluene, with the agitation continued until the toluene is dispersed to a drop-size of 500 microns. After this point has been reached, which should take only a few minutes, during which complex coacervate entities are depositing on the toluene droplets to a thickness of about 5 microns, the temperature of the system is dropped to room temperature (25 degrees centigrade ±5 degrees) over a period of 20 minutes or so, the deposit of the remaining fractions of the complex polymeric liquid wall material commencing, continuing, and forming a thicker wall around the individual toluene droplets until it reaches an ultimate total thickness of 150 to 200 microns. With continued agitation, the system is chilled to about 10 degrees centigrade, which sets the liquid deposits of polymeric complex material to a gelled condition. These gelled capsules are completed except for hardening by cross-linking, if such be desired, in the residual aqueous vehicle. The hardening is accomplished with the addition of ten milliliters of a 25%, by weight, aqueous solution of glutaraldehyde, accompanied by stirring for one to twenty hours, during which the temperature is allowed to rise to the ambient room temperature.

The capsules may be recovered from the vehicle by decantation or filtering, accompanied by drying in an air blast, or by sifting with an adsorbent material such as starch or diatomaceous earth, and afterwards cleaned by repeated washings in a highly-evaporable liquid medium.

EXAMPLES IIa, IIb, IIc

In these three examples, instead of using two ethylenemaleic anhydride copolymers of different weights in aqueous solutions of 40 milliliters each as in Example I, only a single molecular weight aqueous solution, 2% by weight, of the copolymer, is used in an amount of 80 milliliters. The rest of the formulation of the wall material solution remains the same. In IIa, the molecular weight of ethylenemaleic anhydride copolymer is 1500; in IIb, it is 25,000; and in IIc, it is 100,000. It is to be understood, as is common knowledge, that these molecular weight figures are estimated averages.

EXAMPLE III

In this example, the formulation of Example II is used, with the substitution of 80 milliliters of a 2%, by weight, aqueous solution of vinyl methyl ether-maleic anhydride copolymer, of a molecular weight of about 60,000, in place of the ethylenemaleic anhydride copolymer mentioned therein.

EXAMPLE IV

In this example, the formulation of Example II is used, with the substitution of 80 milliliters of a 2%, by weight, aqueous solution of styrenemaleic anhydride copolymer, of a molecular weight of 1600, for the ethylenemaleic anhydride copolymer mentioned.

EXAMPLE V

In this example, there is used only a two-polymer material complex; namely, either gelatin and gum arabic, gelatin and ethylenemaleic anhydride copolymer, gelatin and vinyl methyl ether-maleic anhydride copolymer, gelatin and pectin, gelatin and styrenemaleic anhydride copolymer, or gelatin and phthalated gelatin. Each of these combinations provides a positive polymeric material and a negative polymeric material.

The gelatin-gum-arabic system being the closest to what is disclosed in the mentioned United States Patent, No. 2,800,457, a specific step-by-step procedure will be given to distinguish the present invention thereover, as the gum arabic has not the complexing ability to combine with gelatin readily except at a pH of about 4.5. Nevertheless, the deposit of the coacervate is carried on at room temperature to yield a thick coating, making it possible to encapsulate large liquid droplets.

Into a two-liter beaker are placed

| | Milliliters |
|---|---|
| Water _____ | 700 |
| Gelatin aqueous solution—2% by weight, of the before-specified gelatin _____ | 180 |
| Gum arabic aqueous solution—2%, by weight _____ | 180 | with the system adjusted to 40 degrees to 45 degrees centigrade and the pH adjusted to 4.5. 160 milliliters of toluene is introduced and, with constant stirring, is brought to the desired nucleus drop size, and is cooled to 25 degrees centigrade, with continued stirring, over a period of an hour. The resultant capsules are hardened in the same manner and recovered from the residual vehicle in the manner described in Example I.

The foregoing examples employ the step of bringing about deposit of the polymeric wall material in an agitated liquid vehicle at temperatures near the gelling point of the coacervate phase.

Volatile and non-volatile oils and water-insoluble solids of practically any kind may be encapsulated in the manner described in the various examples, this invention providing for the nucleus encapsulation, with thick polymer walls, of acid pH sensitive nucleus materials, either microscopic or macroscopic in particle size, when carried on at as high a pH as 6.8, and of alkali pH sensitive nucleus materials when carried on at as low as pH as 4.5.

The invention is not to be deemed limited to the particular materials used, as any complexing film-forming polymeric materials of hydrophilic nature may be used, provided that at least a part of such materials lends itself to temperture gelation and cross-linking or hardening by other means. The artificial copolymers mentioned, having large negative charges, are useful where the manufacturing is carried on near the neutral pH point. When a low pH environment is required, the natural negative polymeric materials with a low negative charge should be used for the purpose of inducing the complex coacervation on the acid side.

Solid particles may be substituted for the toluene named in the examples, and other oils than toluene may be so encapsulated.

What is claimed is:

1. A process for making capsules having walls of gelled complex hydrophilic film-forming polymeric material and nuclei of substantially water-immiscible material, including the steps of providing an aqueous solution containing intended nucleus material particles and at least two kinds of hydrophilic polymeric film-forming material having molecules of opposite electric charge in the solution, at least one of the polymeric materials being temperature-gelable and the solution being kept at a temperature above the gelation point of the gelable component at the commencement of the process; lowering the pH of the solution to a point where coacervation commences and the higher weight fractions of coacervate deposit on the nucleus particles; with agitation lowering the temperature just into the gelation range to complete coacervation and the formation of small, more viscous coacervate entities which, because of such viscous condition, form thick walls around each nucleus entity without further pH adjustment; and then dropping the temperature, still with agitation, to a point where the deposited walls gel regardless of the agitation.

2. A process for making capsules, consisting of the steps of providing an aqueous medium in which there are suspended by agitation temperature-gelable complex polymeric film-forming materials, the system initially being kept above the gelation point of said material and at least a portion of such complex polymeric material being present as small entities in a liquid coacervated state; supplying the agitated system with intended nucleus material which must be substantially water-immiscible, the agitation being such as to reduce the nucleus material to the desired particle size if the nucleus material is not of such size when introduced, and to cause contact with and coating of the particles by the coacervate entities to form a liquid film about each to a thickness beyond which more deposit is precluded by the shearing force of the agitation; dropping the temperature of the system gradually to below the gelation point, whereby increased viscosity of the undeposited coacervate entities is brought about, with consequent additional gradual build-up in the thickness of the coacervate entities deposited on the nucleus particles to form a thicker film; and, after the desired thickness of deposited film has occurred, chilling the system to set the films into self-sustaining walls around the nucleus particles.

3. A process for making capsules en masse in an aqueous vehicle, consisting of the steps of dispersing by agitation in a coacervation-inducing aqueous vehicle molecules of oppositely-charged hydrophilic film-forming polymeric materials to form polymer molecule complexes which separate out as a polymer-rich phase that is dispersed throughout the vehicle by the agitation, at least one of the complexing materials giving temperature-gelable characteristics to the dispersed coacervate, and the aqueous vehicle and contents being kept at a high enough temperature to keep them freely mobile and liquid; introducing into the system the intended substantially water-immiscible nucleus material, which is interspersed with the dispersed coacervate material, whereby the liquid coacervate material by contact forms a liquid wall about each dispersed particle of nucleus material to a thickness limited by the shearing force of the agitation; gradually dropping the temperature of the system to below the gelation point to increase the viscosity of the undeposited coacervate material, which, when it comes into contact with the previously-formed liquid walls, merges therewith and forms thicker walls more resistant to said shearing force; and then dropping the temperature rapidly to set the thick walls by gelation thereof, forming self-supporting capsule walls.

4. A process for making capsules consisting of minute particles of nulceus material, particularly but not necessarily liquid, said particles ranging from microscopic size to those visible to the unaided eye, protectively retained with a wall of temperature-gelled complex film-forming hydrophilic polymeric material, and manufactured en masse in a liquid vehicle without individual handling, consisting of the steps of providing an aqueous medium containing polymeric materials of the hydrophilic type, said polymeric materials existing in the aqueous medium in gelable complex coacervate entities and initially kept above the gelation temperature thereof; introducing substantially water-immiscible nucleus material with agitation to reduce it to the desired particle size if not already in such condition and to intersperse the coacervate entities with the nucleus particles thereon so that they come into contact, the coacervate entities forming a film around each particle until a thickness is reached at which, because of the relation of the agitation to the viscosity of the coating, the shearing forces present preclude any further deposit of coacervate entities; with continued agitation dropping the temperature of the system gradually to gradually increase the viscosity of the undeposited complex polymer entities, which allows more and more of them to deposit on the particles of nucleus material without being whipped off by the agitation shearing forces, until the desired thickness is attained; and chilling the so-formed films to set them to a consolidated self-supporting state.

References Cited

UNITED STATES PATENTS

| | | | |
|---|---|---|---|
| 2,800,457 | 7/1957 | Green et al. | 252—316 |
| 2,980,941 | 4/1961 | Miller | 252—316 X |
| 3,041,289 | 6/1962 | Katchen et al. | 252—316 |
| 3,069,370 | 12/1962 | Jensen et al. | 252—316 X |

LEON D. ROSDOL, *Primary Examiner.*

R. D. LOVERING, *Examiner.*

UNITED STATES PATENT OFFICE
CERTIFICATE OF CORRECTION

Patent No. 3,341,466 September 12, 1967

Carl Brynko et al.

It is hereby certified that error appears in the above numbered patent requiring correction and that the said Letters Patent should read as corrected below.

In the heading to the printed specification, lines 3 to 6, for "Carl Brynko, 4320 Frieda Lane 45429; Joseph A. Bakan, 1230 Benfield Drive 45429; Robert E. Miller, 2319 Rockwell Court 45420; and Joseph A. Scarpelli, 245 Wroe Ave. 45406, all of Dayton, Ohio" read -- Carl Brynko, Joseph A. Bakan, Robert E. Miller and Joseph A. Scarpelli, all of Dayton, Ohio, assignors to The National Cash Register Company, Dayton, Ohio, a corporation of Maryland --.

Signed and sealed this 15th day of April 1969.

(SEAL)
Attest:

Edward M. Fletcher, Jr.

Attesting Officer

EDWARD J. BRENNER

Commissioner of Patents